(No Model.) 4 Sheets—Sheet 3.

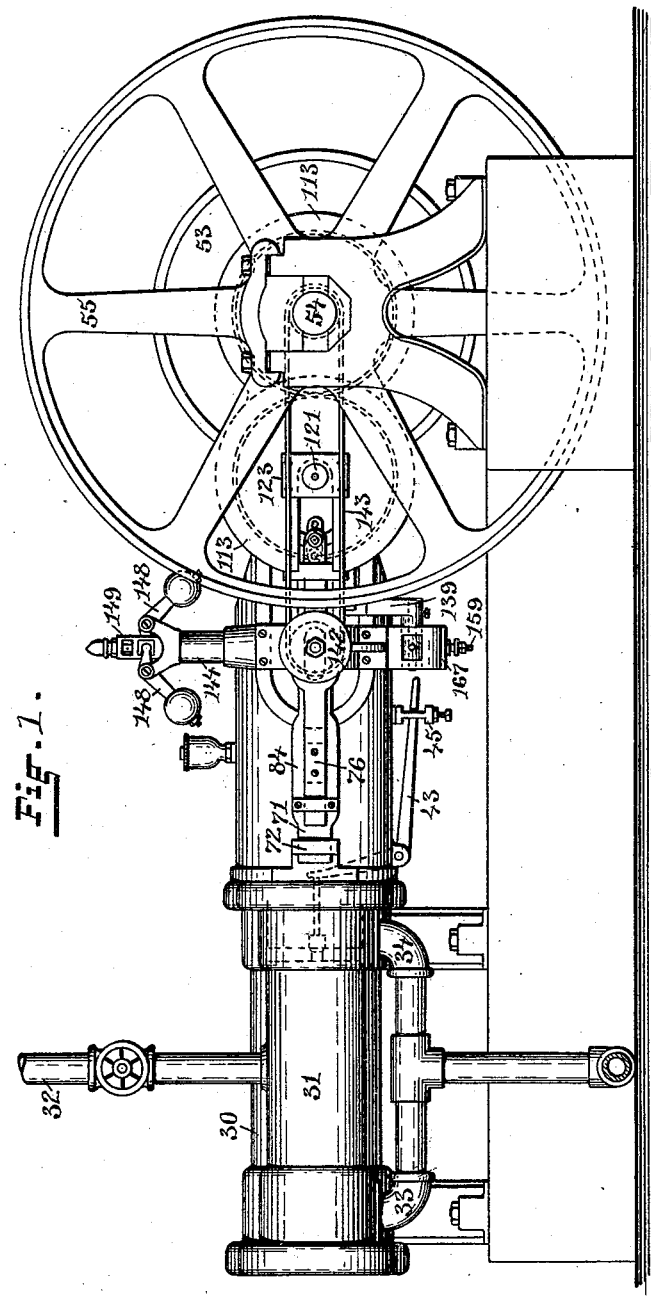

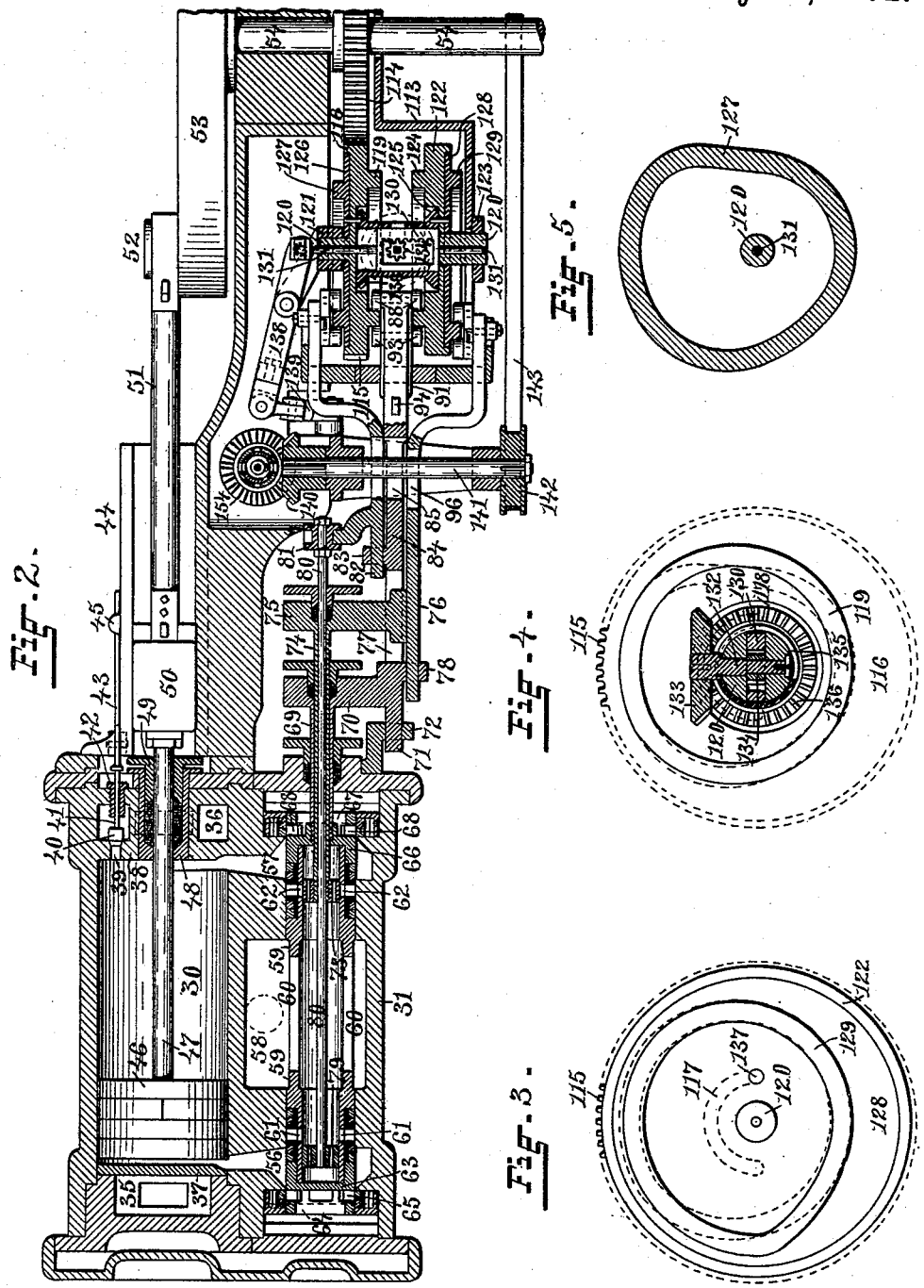

F. J. WATERS.
VALVE GEAR FOR ENGINES.

No. 478,973. Patented July 12, 1892.

WITNESSES:
Henry J. Miller
M. F. Bligh

INVENTOR:
Frank J. Waters
by Joseph A. Miller & Co.
Attys.

(No Model.) 4 Sheets—Sheet 4.
F. J. WATERS.
VALVE GEAR FOR ENGINES.
No. 478,973. Patented July 12, 1892.
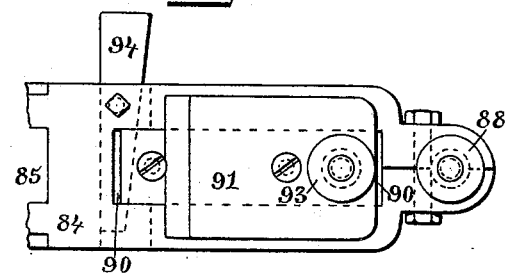
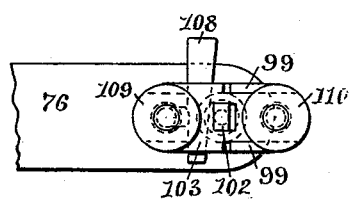
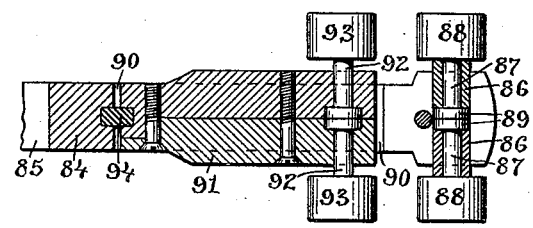
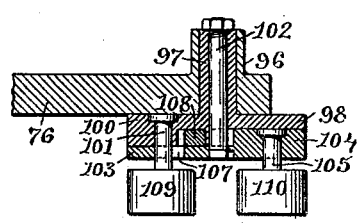
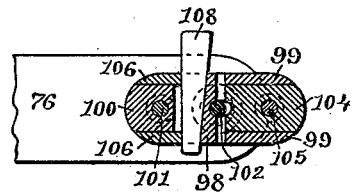
WITNESSES: INVENTOR:

UNITED STATES PATENT OFFICE.

FRANK J. WATERS, OF PROVIDENCE, RHODE ISLAND, ASSIGNOR OF ONE-HALF TO GEORGE HOWE, OF SAME PLACE.

VALVE-GEAR FOR ENGINES.

SPECIFICATION forming part of Letters Patent No. 478,973, dated July 12, 1892.

Application filed December 22, 1891. Serial No. 415,865. (No model.)

*To all whom it may concern:*

Be it known that I, FRANK J. WATERS, of Providence, in the county of Providence and State of Rhode Island, have invented certain new and useful Improvements in Valve-Gear for Engines; and I hereby declare that the following is a full, clear, and exact description of the same, reference being had to the accompanying drawings, forming part of this specification.

This invention has reference to improvements in engines.

The object of this invention is to produce an engine in which the steam may be automatically and absolutely cut off from the cylinder when the normal speed of the engine is exceeded and the valve-ports opened when the speed of the engine is reduced to the normal.

Another object of this invention is to produce a device by which the drag exerted by the cut-off-valve controlling mechanism at the starting and stopping of the engine will be obviated.

Still further the object of this invention is to reduce the friction of the operating parts of the engine and to prevent cramping resulting from the wear of the roller-bearings.

Finally the object of this invention is to produce a complete and evenly-balanced engine, which shall be automatically controlled, economical in operation, and substantial in construction.

The invention consists in the peculiar combination, with slide-valves and cut-off valves contained therein, of the novel means for operating the same, to be hereinafter described.

The invention further consists in certain other peculiar features of construction and combination of novel parts, which will hereinafter be more fully described, and pointed out in the claims.

Figure 6:
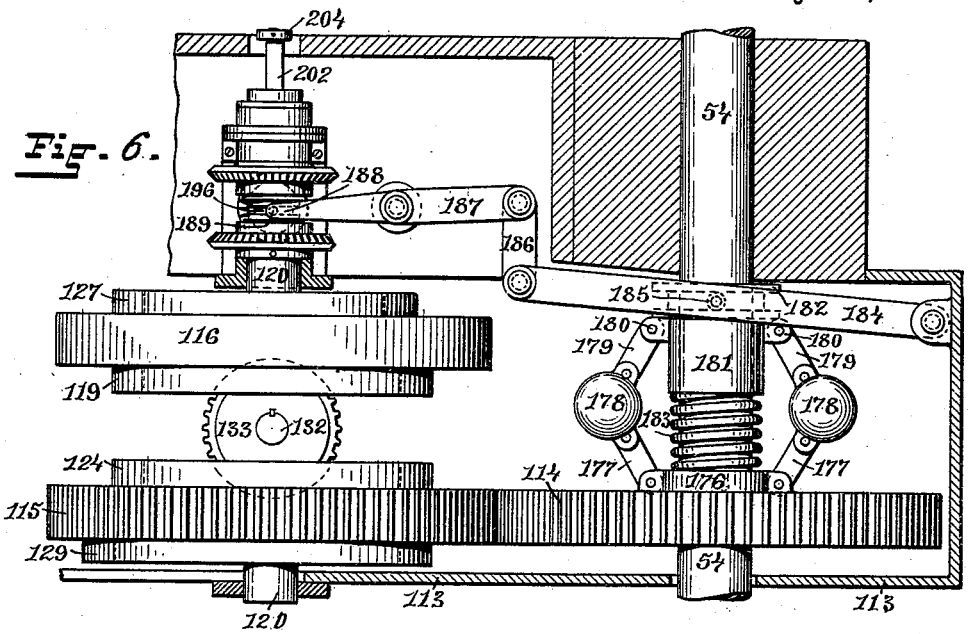
Figure 7:
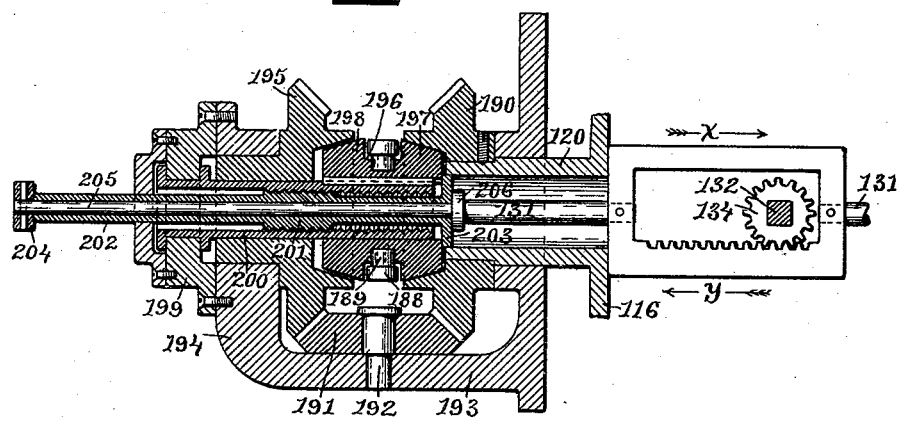
Figure 8:
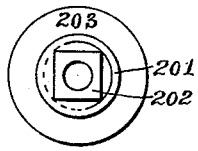

Figure 1 represents a side elevation of the improved engine. Fig. 2 represents a horizontal sectional view of the same, indicating the operation of the various parts. Fig. 3 represents a face view of the valve-controlling-cam mechanism, showing the cam for operating the forward cut-off valve. Fig. 4 represents a cross-sectional view through the center of the same to show one of the cams operating the slide-valve and bevel-gears for adjusting the positions of the cams which control the cut-off valves. Fig. 5 is a cross-sectional view of the cam for controlling the movement of the rear cut-off valve, taken just beyond the outer face of the gear by which the slide-valve is driven. Fig. 6 represents a top view of the cam motions and shifting devices connected to a shaft-governor. Fig. 7 represents a longitudinal sectional view of the cam-shifting device adapted to be operated by a shaft-governor. Fig. 8 represents an enlarged end view of the square sleeve having a central enlarged and circular threaded portion and an end disk. Fig. 9 represents an elevation of a portion of the slide-valve drive-arm and the adjustable roller-bearing for engaging the central cams. Fig. 10 is a top view of the same, partially in section, to indicate the manner in which the roller-bearings are journaled. Fig. 11 represents an elevation of one of the cut-off cam-bearings and a portion of the valve-operating arm. Fig. 12 represents a top view of the same, partially in section, to more clearly indicate the construction of the same. Fig. 13 represents a sectional view through the adjustable pivoted bearing-block in which the roller-bearings are journaled.

Similar numbers of reference designate corresponding parts throughout.

In the drawings the engine is shown as secured to and supported by a suitable base, being provided with a cylinder 30 and a valve-case 31, to which steam is supplied through the pipe 32, connected with the boiler or with the steam-separator, and from which the exhaust-steam is allowed to escape through the exhaust-pipe 33, connecting with the rear end of the valve-chamber, and through the exhaust-pipe 34, connecting with the forward end of said valve-chamber, these pipes being united by a T-fitting having a single escape-pipe. The exhaust-pipes are also connected with the spaces 35 and 36, located in the ends of the cylinder 30, the space 35 being separated from the main portion of the cylinder by the partition 37, adapted to be broken by any severe pounding of the piston-head when water accumulates in this end of the cylinder, taking up the strain which would otherwise be exerted on the cylinder-head, preventing damage to the same, as well as danger to the operator. When this partition is broken, free egress for the water and steam is furnished by the connection with the exhaust-pipe 33. At the forward end of the cylinder and cast in one piece therewith is the partition 38, having a perforation 39, the outer end of which is ground to form a seat for the valve 40, provided with a valve-stem 41, horizontally movable through a perforation in the screw-plug 42, screwed through the outer forward head of the cylinder, and against the outer end of this valve-stem 41 is pressed the short end of the bell-crank lever 43, pivoted at its angle between lugs provided on the guide-box 44, the long end of the lever being raised by a suitable spring supported in a bracket 45 and adjusted by a set-screw. When the pressure in the cylinder becomes dangerous, the valve 40 will be forced outward and a small amount of water and steam will escape through the perforation 39, and thence through the exhaust-pipe. The valve 40 will be rapidly operated by the pressure of the spring-lifted lever to again close this perforation.

The piston-head 46 is provided with a new and improved packing, which will hereinafter be more particularly described, and is secured to the end of the piston-rod 47, which is adapted to reciprocate through the stuffing-box in the forward end of the cylinder, this stuffing-box being formed of the sleeve 48, the inner wall of which is contracted at one end, holding the stuffing material, and the compression-sleeve 49, adapted to compress said material around the piston-rod. The outer end of the piston-rod is secured to the sliding block 50, which moves in the guide-box 44, and to which is pivoted one end of the connecting-rod 51, the other end of this rod having the usual bearing, in which is journaled the stud 52, secured on the face of the drive-wheel 53 near the circumference of the same. This drive-wheel is keyed to the drive-shaft 54, journaled on suitable bearings and carrying the fly-wheel 55.

The valve-casing is provided with the rear passage 56, connecting with the rear end of the cylinder and with the forward passage 57 connecting with the forward end of said cylinder. These passages are also connected with the exhaust-pipes. At the center of this casing is formed the steam-chest 58, into which the steam from the boiler is admitted.

The slide-valve 59 is generally cylindrical in shape and is free to reciprocate in bearings formed in the walls separating the steam-chest 58 from the passages 56 and 57, these bearings being packed by means of rings of metal cut into segments of a circle, two rings being used to break the joints, these rings being held in place by flanged sleeves surrounding the slide-valve, part of the walls of which are cut away. At the central portion the slide-valve 59 has the longitudinal slots 60, through which the steam supplied to the steam-chest 58 passes into the interior of said valve, and intermediate between the ends of these slots and the end walls of the slide-valve are the outlet-ports 61, through which steam is admitted to the passage 56, and the ports 62, through which steam is admitted to the passage 57.

At a short distance to the rear from the ports 61 is the end wall 63, closing this end of the valve, and beyond this wall is an extension 64, open at the end and having ports 65 to allow the exhaust-steam from the passage 56 to pass through these ports and into the rear end of the valve-casing when the slide-valve moves forward. The forward end wall 66 of this valve is also provided with an extension 67, open at the end and having ports 68, through which exhaust-steam from the passage 57 may pass to the forward end of the valve-casing. These extensions 64 and 67 move horizontally with the slide-valve in peculiar metallic-packed bearings, which will hereinafter be more fully described. The forward end wall of the slide-valve has a threaded perforation into which the inner end of the tubular valve-stem 69 is secured, this valve-stem passing through a stuffing-box in the forward end of the valve-casing and the outer end being secured to the reciprocating bracket 70, forming part of the valve drive-rod, which has an arm 71, moving in a bearing provided on the bracket 72, which is ordinarily secured to the valve-case. The forward cut-off valve 73 is perforated and is formed to closely fit the bore of the slide-valve, and is provided with a tubular valve-stem 74, which passes through the tubular valve-stem of the slide-valve and through a stuffing-box formed in the reciprocating bracket 70, and is secured to the stud 75, carried by the rod 76, which extends through a slot 77 in the valve drive-rod, the end portion of the rod 76, moving in a bearing 78, secured to the bracket 70. The rear cut-off valve 79 closely fits the bore of the slide-valve and is furnished with one or more small perforations to allow the steam to pass through and balance this valve, in the center of which is secured an end of the valve-stem 80, which extends through the length of the slide-valve and through the hollow valve-stem 74, finally extending through a stuffing-box in the stud 70 and being secured to the bent arm 81 of the rod 82, the end portion of which is movable in a bearing 83, secured to the inner face of the valve drive-rod.

The valve drive-rod 84, having the bracket 70 and the slot 77, extends forward to engage with the mechanism for operating the slide-valve, having a slot 85, through which the governor drive-shaft extends. The forward end is split transversely and has a transverse bore in which is clamped the sleeve 86, having bearings for the shafts 87 87, carrying the rolls 88 88, and central circular recesses into which fit the disks 89 89 on the inner ends of said shafts. Near this forward end the valve drive-rod has also a slot 90, in which the sliding block 91 is secured. This block is formed of two portions having flanges which extend over the faces of the drive-rod, these pieces being secured together by bolts or screws. Each half of the block has a bearing with an inner enlarged portion in which the shafts 92 92, having disk ends, are journaled, these shafts being driven through the bearings in the respective halves of the blocks from the inner surfaces, and the rolls 93 93 then driven onto or otherwise secured to the outer ends of said shafts. The halves of the block are now placed in position, the narrow portions entering the slot 90, and are secured together, as aforesaid. The rolls 93 93 are now capable of adjustment with reference to the rolls 88 88 by means of the tapering pin 94, movable in a vertical slot in said drive-rod 84 and bearing against the rear end of the block 91.

The forward cut-off valve-rod 76, having the stud 75, to which the end of the tubular valve-stem 74 is secured, extends forward from that portion working in the bearing 78 and has a longitudinal slot 95, through which the governor drive-shaft extends. Beyond this slot the rod 76 is bent outward, then forward on a plane parallel to but outwardly distant from that of the first-mentioned portion, the end being provided on its inner surface with a swiveled roller-bearing, preferably constructed as more clearly shown in Figs. 11, 12, and 13, in which 76 represents a portion of this rod, which has the perforated stud 96, the perforation of which extends through the thickness of the rod 76 and serves as a bearing for the hollow shaft 97 and the cross-plate 98, provided with lips 99 99 and a block 100, in which the shaft 101 is journaled. The head of the bolt 102 fits into a slotted recess formed in the center of the cross-plate 103, the shaft of the bolt extending through the tubular shaft 97 and being secured in place by a nut and washer. The cross-plate 103 has a block 104, in which the shaft 105 is journaled, which is movable between the lips 99 of the corresponding portion of the cross-plate 98. At the opposite end of this plate 103 are formed the lips 106, sliding over the edges of the block 110, and in the face of this portion of the cross-plate is a slot 107, through which the shaft 97 extends. A key 108 is also provided and is driven transversely through between the inner ends of the lips 106 and a suitable rib on the plate 98, thus drawing the two ends of the plate together. After these portions have been secured, as described, the rolls 109 and 110 are driven onto their respective shafts.

The rear cut-off-valve drive-rod 82, having the bent arm 81, to which the end of the valve-stem 80 is secured, has one end movable in a bearing 83 and extends forward, having the slot 111 and is bent outward and then forward on a plane parallel to but inwardly distant from the plane of the main portion of the rod, and on its forward inner surface it is provided with a swiveled roller-bearing 112, similar in construction and operation to that provided on the forward end of the rod 76.

The valve-driving mechanism is contained within a case 113 and is driven from a gear 114, secured on the shaft 54, the teeth of this gear intermeshing with those of the gear 115, the number of teeth on one gear corresponding to that on the other. The gear 115 is formed around the circumference of the plate 116, which has a semicircular slot 117, (indicated in dotted lines in Fig. 3,) and on its inner surface a recess 118 and a cam-ring 119. This plate is carried by a shaft 120, working in a bearing 121, and from the inner surface of this plate the shaft 120 extends through a corresponding plate 122, which is keyed thereto and is journaled in a bearing 123. This plate 122 has a cam 124 and a central recess 125, formed on its inner surface, and also a semicircular slot similar to that of the plate 116. These cams 119 and 124 have a corresponding throw and return and are engaged by the roller-bearings 88 and 93 of the valve drive-rod 84. The revolution of the plates 116 and 124 will therefore cause a reciprocating motion to be imparted to the rod 84 and to the slide-valve 59 by means of the valve-stem 69.

In the outer surface of the cam-plate 116 a circular recess is formed adapted to movably contain the plate 126, which has a cam-ring 127 engaged between the rollers of the swiveled bearing 112, and by the revolution of this plate the rod 82 is operated to move the rear cut-off valve 79 to wholly or partially open or close the ports 61 of the slide valve. The plate 122 has also a circular recess in its outer surface, in which fits the plate 128, having the cam-ring 129, which engages the swiveled roller-bearing on the rod 76, the revolving of this cam 129 operating the rod 76 to move the cut-off valve 73 to wholly or partially open or close the ports 62 of the slide-valve.

The central portion of the shaft 120 is somewhat enlarged and has a transverse slot in which the rack 130 is free to move longitudinally, and is operated by the rod 131, movable in a central longitudinal perforation in said shaft, which has also a vertical central perforation, in which the shaft 132, carrying the bevel-gear 133 and the small gear 134, engaging the rack, are secured. Surrounding this central portion of the shaft 120 is a sleeve 135, which has a central slot extending through one-half of its radius, in which the geared end of the shaft 132 is free to move in the direction of said slot, while formed in part with or secured to one end of the sleeve is the beveled gear 136, which intermeshes with the beveled gear 133, the gear 136 being contained in the depression 118 of the plate 116 and connected by a pin passing through the semicircular slot in said plate with the cam-plate 126. The flanged end 137 of the sleeve 135 is connected with the cam-plate 128 by a pin 137, which passes through the semicircular slot in the plate 122.

It is evident that when the rack 130 is operated by the rod 131 the small gear 134 will be revolved and will turn the shaft 132 and the beveled gear 133, which, engaging with the gear 136 on the sleeve, will turn said sleeve, and by means of the pins connecting with the cam-plates 126 and 128 these plates and their cams will also be turned, their limit of travel being one-half of a revolution, and the ends of the rods 76 and 82 will be reciprocated by their roller-bearings moving around the cams, which are adjusted with relation to each other and the motion of the slide-valve to draw or throw at the proper time.

To the inner end of the rod 131 is pivoted the arm 138, which swings on a fulcrum and is secured to the shifting-arm 139 of the regulator mechanism by a pivoted link.

When a shaft-governor is used on my improved engine, I prefer to provide the cam-plate 122 with the gear 115, placing the driving-gear 114 in a position on the shaft 54 to intermesh with the same. I also extend the casing 113, inclosing a somewhat larger space.

On the shaft 54 I clamp the ring 176, in which the ends of levers 177 are pivoted, the other ends of these levers being pivoted to the weights 178, which are connected by the pivoted arms 179 with the studs 180, secured to the sleeve 181, the outer end of which is provided with a grooved sleeve-pulley 182.

Between the inner end of the sleeve 181 and the ring 176 is placed the spring 183, the coils of which encircle the shaft 54 and tend to force the sleeve 181 along the shaft, and to thus draw the weights inward toward the shaft.

Pivoted to the end of the casing 113 is a lever 184, provided at its longitudinal center with a stud 185, which enters the groove in the pulley 182. The other end of this lever 184 is pivotally secured by the link 186 to the forward end of the lever 187, pivoted at or near its center and having at its rear end the branches 188, provided with the studs 189.

Secured to the inner end of the shaft 120, which, when the shaft-governor is used, is made tubular, is a beveled gear 190, corresponding to the gear 153 of the vertical governor, and intermeshing with this gear is the horizontal beveled gear 191, rotatable on the shaft 192, secured in the bracket 193, this bracket having a bent-up arm 194, provided with a bearing in which the tubular base of the gear 195 is journaled. These gears 190 and 195 are provided with friction cavities corresponding to those of the gears 153 and 154 of the vertical governor. The motion being imparted to the gear 190 in one direction by the shaft 120 will be transmitted by the gear 191 to rotate the gear 195 in the other direction.

Contained between the gears 190 and 195 and capable of slight longitudinal movement is a tubular block having a central circumferential groove 196, adapted to be engaged by the studs 189 of the lever 187, while the ends of this block are slightly tapered, forming clutch-blocks, that marked 197 engaging in the cavity of the gear 190, and that marked 198 engaging in the cavity of the gear 195.

Journaled at one end in the bearing of the bracket extension 199 is a sleeve 200, which extends partially through the tubular portion of the clutch-block and is keyed thereto in a manner to allow of the independent longitudinal movement of the clutch-block, but to prevent any independent rotation of either this block or sleeve. The interior surface of the sleeve 200 is screw-threaded for a portion of its length, and engaging with this thread is a nut 201, formed on the exterior surface of the square tube 202, moving in a square bearing, one end of which is provided with the flange 203, slightly larger than the bore of the clutch-block and bearing against the end marked 197, the other end of this tube 202 bearing against the plate 204, secured to the end of the rod 205, which extends through the tube and is secured to the end of the rack-operating rod 131, having at this end a circumferential shoulder 206, against which the flange 203 bears. This shaft-regulator and clutching device is similar in its operation to that of the vertical regulator, with the exception that the movement of the rack 130 is reversed. As the speed of the shaft is increased, the weights will be driven in a larger radius and will draw the ends of the pivoted arms together, also drawing the grooved pulley 182 against the force of the spring 183. The connected ends of the levers 184 and 187 will also be drawn in that direction, and the clutch-block engaged between the studs of the branches 188 will move the clutch 198 into contact with the cavity of the gear 195. The clutch-block will be rotated by this gear in a direction to advance the tube 202 by the engagement of its nut with the interior of the sleeve 200 in a direction indicated by the arrow X in Fig. 11, moving the rack 130 in the same direction and operating the cut-off cams, as above described. When the speed of the engine falls below the normal, the clutch 197 will be moved by the pivoted arms and their connecting mechanism into contact with the cavity of the gear 190, which, traveling in a direction opposite to that marked 198, will also turn the clutch 197 and the sleeve 200 in this direction, and by the engagement of the nut 201 with the threaded interior surface of the sleeve will drive the tube 202 and the rod 205, operating the rack 130, in the direction indicated by the arrow $y$ in Fig. 11 of the drawings, the cut-off valve-cams being operated accordingly.

When steam is shut off from the engine, the speed of the shaft 54 will gradually diminish; but before the shaft stops the tube 202 will be driven in the direction indicated by the arrow $y$ until the flange 203 engages the end of the clutch-block and draws it out of engagement with the cavity of the gear 197 and preventing drag on the engine when starting.

Having thus described my invention, I claim as new and desire to secure by Letters Patent—

1. In an engine having a cylinder and a valve-chamber, the combination, with a slide-valve longitudinally movable in said chamber and provided with a tubular valve-stem and inlet and outlet ports, of a forward cut-off valve contained within said slide-valve and provided with a tubular valve-stem extending through the stem of the slide-valve, a rear cut-off valve also contained within said slide-valve and provided with a valve-stem extending through the stem of the forward cut-off valve, and means for operating said valves, as described.

2. The combination, with the drive-shaft of an engine and a gear carried thereby, of one or more rotatable plates provided with cams, one of said plates having a circumferential gear intermeshing with the gear of the drive-shaft, a connecting-rod having roller-bearings traveling on said cams and connecting with a valve-stem, and a slide-valve contained within a suitable case and adapted to be reciprocated, as described.

3. The combination, with the cut-off valves of an engine, provided with valve-stems, and connecting-rods secured to said stem and provided with roller-bearings, of rotatable plates having cams adapted to engage said roller-bearings and means for rotating said plates independently to operate said valves dissimultaneously, for the purpose described.

4. In an engine having valves, as described, the combination, with the rotating plates 116 and 122, supported on a shaft journaled in bearings and provided with the cams 119 and 124, one of said plates provided with a circumferential gear, and a connecting-rod having roller-bearings working on said cams and adapted to operate the slide-valve, of the cam-plates 126 and 128, journaled on said shaft and having cams 127 and 129, roller-bearings moving on said cams and pivoted to the connecting-rods of the cut-off valves, and means for operating said valves, as described.

5. The combination, with the rotatable plates 115 and 122, supported on the shaft 120, journaled in suitable bearings, provided with the cams 119 and 124, the cam-plates 126 and 128, having cams 127 and 129, independently rotatable on said shaft in depressions in the outer faces of said first-mentioned plates, a transverse slot formed in the central enlarged portion of said shaft and a rack movable therein and operated by a rod extending through a longitudinal perforation in said shaft, and a vertical shaft journaled in said longitudinal shaft and carrying an interior gear 134, adapted to be operated by said rack, of a sleeve surrounding the central portion of the longitudinal shaft and having a central semi-circumferential slot and enlarged ends, one of which has gear-teeth, a beveled gear carried by the outer end of the vertical shaft and intermeshing with the gear of said sleeve, and pins secured in said enlarged ends of the sleeve and extending through radial slots in the cam-plates 116 and 118, the other ends being fastened in the plates 126 and 128 and adapted to operate the same, as described.

6. The combination, with the rack 130, contained within a central transverse slot in the shaft 120, the rod 131, extending through a central longitudinal perforation in said shaft and secured to said rack, the pinion-gear 134, also contained within said slot and adapted to be rotated by said rack, a vertical shaft 132, journaled in said horizontal shaft and operated by said pinion, and a beveled gear 113, secured to the outer end of said shaft, of a sleeve 135, surrounding said shaft 120 and having a semi-circumferential slot through which the vertical shaft is free to move, enlargements on the ends of said sleeve, one of which forms a gear intermeshing with the gear 113, and rotatable cam-plates secured to said enlarged ends of the sleeve and adapted to operate the cut-off valves through suitable connections, as described.

7. The combination, with the slide-valve and cut-off valves of a steam-engine, a system of cams adapted to operate said slide-valve through a connecting-rod, an independent system of cams for operating said cut-off valves, and mechanism for shifting the same, of a regulating device consisting of two gears rotating in parallel planes in directions opposite to one another and driven by a third gear, a clutching device supported between said gears, adapted to be drawn into contact with the lower gear when the speed of the engine is above the normal and into the upper gear when said speed decreases below said point, the lower portion of said clutch having depending fingers, a sleeve supported in bearings and having a cross-bar at its upper end adapted to be rotated by said clutching device, a screw-thread formed around said sleeve and a nut working thereon and pivoted in a suitable frame secured to a rock-shaft, and mechanism intermediate said shaft and the shifting mechanism of the cut-off-valve motion to operate the same, as described.

8. In an engine, the combination, with a hollow shaft carrying independently-rotatable cam-plates and having a transverse slot, a rack contained within said slot and means by which the motion of the rack is conveyed to said cam-plates, a rod secured to said rack and extending through the hollow end of said shaft, a tube having a square outer surface working in a square bearing, a flange at one end bearing against said rod and provided with a screw-threaded portion, and a sleeve screw-threaded on a portion of its interior surface and journaled at one end in a suitable bearing, of a friction-clutch surrounding the free end of said sleeve and keyed thereto to allow of independent longitudinal movement and to prevent independent rotatory motion, a beveled gear secured to the end of said tubular shaft and having a friction-cavity in the face thereof in which one end of the friction-clutch moves, a similar gear working in an independent bearing parallel to said first-mentioned gear and also having a friction-cavity in its face, in which the opposite end of the friction-clutch moves, a third gear intermeshing with said gears and working on a shaft and adapted to transfer the motion of one to the other in the opposite direction, and mechanism operated by the movement of the engine to shift the friction-clutch from the cavity of one gear to the cavity of the other, substantially as described.

9. The combination, with the connecting-rod 84, having a slot 90 and having its end transversely split and a transverse perforation in said end, a split sleeve 86, clamped within said perforated end, the shafts 87 87, having enlarged ends journaled within said sleeve, and the rolls 88 88, carried on the outer ends of said shafts, of a block formed of two halves 91, adapted to fit the slot 90 and having lips extending beyond the edges of said slot, the shafts 92, having enlarged ends journaled in bearings in the halves of this block and carrying the rolls 93 93 on their outer ends, and the key-pin 94, working in a vertical slot in said connecting-rod and bearing against said blocks, as and for the purpose described.

10. The combination, with the connecting-rod 76, having the stud 96, a perforation extending through said rod and stud and a tubular shaft journaled therein and carrying the cross-plate 98, having lips 99, formed on the edges at one end, and a block 100, carrying the shaft 101, and a roll 109, secured to the outer end of said shaft, of a cross-plate 103, having a block 104, carrying a shaft 105, and a roll 110, secured to the outer end of said shaft and adapted to move between the lips 99 of the plate 98 and having lips 106, engaging the edges of said block 100, a slot in said lipped end, in which the shaft 101 may move and held in place by the bolt 102, having a square head engaging a slotted recess in said plate 103, and a key 108, bearing against the square edges of said lips 106 and against a transverse rib on the plate 98 to force these plates one over the other and to draw the rolls together, as and for the purpose set forth.

In witness whereof I have hereunto set my hand.

FRANK J. WATERS.

Witnesses:
GEORGE HOWE,
HENRY J. MILLER.